United States Patent
Snyder, II et al.

(10) Patent No.: US 10,078,601 B2
(45) Date of Patent: Sep. 18, 2018

(54) APPROACH FOR INTERFACING A PIPELINE WITH TWO OR MORE INTERFACES IN A PROCESSOR

(71) Applicant: Cavium, Inc., San Jose, CA (US)

(72) Inventors: Wilson P. Snyder, II, Holliston, MA (US); Anna Kujtkowski, Rochdale, MA (US); Albert Ma, Belmont, MA (US); Paul G. Scrobohaci, Menlo Park, CA (US)

(73) Assignee: Cavium, Inc., San Jose, CA (US)

( * ) Notice: Subject to any disclaimer, the term of this patent is extended or adjusted under 35 U.S.C. 154(b) by 268 days.

(21) Appl. No.: 14/940,982

(22) Filed: Nov. 13, 2015

(65) Prior Publication Data

US 2016/0140059 A1   May 19, 2016

Related U.S. Application Data

(60) Provisional application No. 62/079,893, filed on Nov. 14, 2014.

(51) Int. Cl.
*G06F 13/00*   (2006.01)
*G06F 13/16*   (2006.01)
*G06F 13/40*   (2006.01)

(52) U.S. Cl.
CPC ...... *G06F 13/1605* (2013.01); *G06F 13/4022* (2013.01)

(58) Field of Classification Search
USPC .................. 710/104–110, 308–317
See application file for complete search history.

(56) References Cited

U.S. PATENT DOCUMENTS

| | | | |
|---|---|---|---|
| 2013/0080714 A1* | 3/2013 | Kegel | G06F 12/1081 711/154 |
| 2016/0062911 A1* | 3/2016 | Kegel | G06F 12/1081 710/308 |
| 2016/0085687 A1* | 3/2016 | Baruch | G06F 12/1036 711/147 |

* cited by examiner

*Primary Examiner* — Raymond Phan (57) ABSTRACT

In an embodiment, interfacing a pipeline with two or more interfaces in a hardware processor includes providing a single pipeline in a hardware processor. The single pipeline presents at least two visible units. The single pipeline includes replicated architecturally visible structures, shared logic resources, and shared architecturally hidden structures. The method further includes receiving a request from one of a plurality of interfaces at one of the visible units. The method also includes tagging the request with an identifier based on the one of the at least two visible units that received the request. The method further includes processing the request in the single pipeline by propagating the request through the single pipeline through the replicated architecturally visible structures that correspond with the identifier.

20 Claims, 7 Drawing Sheets

APPROACH FOR INTERFACING A PIPELINE WITH TWO OR MORE INTERFACES IN A PROCESSOR

RELATED APPLICATIONS

This application claims the benefit of priority of U.S. Provisional Application No. 62/079,893 filed Nov. 14, 2014, the disclosure of which is incorporated herein by reference in its entirety.

BACKGROUND

A system memory management unit (SMMU) (sometimes called a memory management unit) is a hardware unit on a chip that translates virtual addresses from a user process running on a device to a physical memory address. The SMMU employs various logic and memory resources to convert the virtual address to the physical address. The memory resources, for example, can include content-addressable memories (CAMs), lookup tables (LUTs) and cache memories. Processors can also employ multiple SMMUs on the chip.

SUMMARY

In an embodiment, interfacing a pipeline with two or more interfaces in a hardware processor includes providing a single pipeline in a hardware processor. The single pipeline presents at least two visible units. The single pipeline includes replicated architecturally visible structures, shared logic resources, and shared architecturally hidden structures. The architecturally hidden structures can be at least one architecturally hidden or architecturally invisible structure. The method further includes receiving a request from one of a plurality of interfaces at one of the visible units. The method also includes tagging the request with an identifier based on the one of the at least two visible units that received the request. The method further includes processing the request in the single pipeline by propagating the request through the single pipeline through the replicated architecturally visible structures that correspond with the identifier.

In an embodiment, the request is a memory request, and the method also includes outputting a physical address to a memory to complete the memory request.

In an embodiment, the architecturally visible structures include at least one of an architecturally visible memory, a content addressable memory, and a register, and the architecturally hidden structures include at least one of transition look aside buffer and page walkers.

In an embodiment, processing the request at the architecturally hidden structures includes receiving the request from any of the replicated architecturally visible structures.

In an embodiment, the method includes utilizing the architecturally hidden structures independent from utilizing of any of the replicated architecturally visible structures.

In an embodiment, the method includes converting information of the request representing at least one of a device, a user and a virtual machine to information representing a context including at least one of a virtual machine identifier, a process identifier, and at least one pointer to a page table. Converting information of the request includes converting the information to a context at the replicated architecturally visible structures. The method can also include converting the context to a physical memory address at the architecturally hidden structures.

In an embodiment, each of the replicated architecturally visible structures corresponds with one of the presented visible units.

In an embodiment, a system for interfacing a pipeline with two or more interfaces in a hardware processor includes a single pipeline in a hardware processor. The single pipeline presents at least two visible units. The single pipeline including replicated architecturally hidden structures, shared logic resources and shared architecturally hidden structures. The visible units are configured to receive a request from one of a plurality of interfaces. The system also includes a tagging module configured to tag the request with an identifier based on the one of the at least two visible units that received the request. The single pipeline is configured to process the request by propagating the request through the replicated visible structures corresponding with the identifier.

In an embodiment, the request is a memory request. The single pipeline is further configured to output a physical address to a memory to complete the memory request.

In an embodiment, the architecturally visible structures include at least one of an architecturally visible memory, a content addressable memory, and a register, and the architecturally hidden structures include a transition look aside buffer and/or a page walker.

In an embodiment, the architecturally hidden structures are further configured to process the request by receiving the request from any of the replicated architecturally visible structures.

In an embodiment, the architecturally hidden structures are utilized independently from utilizing of any of the replicated architecturally hidden structures.

In an embodiment, the single pipeline is configured to convert information of the request representing at least one of a device, a user and a virtual machine to information representing a context including at least one of a virtual machine identifier, a process identifier, and at least one pointer to a page table. The single pipeline is further configured to convert information of the request at the replicated architecturally visible structures. The single pipeline is further configured to convert the context to a physical memory address at the architecturally hidden structures.

In an embodiment, each of the replicated architecturally visible structures corresponds with one of the presented visible units.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

A processor can interface with other devices, such as network interfaces, hard drive controllers, or coprocessors. When one of these devices interfaces with the processor, the processor has to translate memory addresses of the device to a memory address, called a virtual memory address, of the processor, called a physical address. The device may further be running one or more processes, such a web browser or email program. A system memory management unit (SMMU) (sometimes also called a memory management unit (MMU)), translates virtual addresses from the device to a physical address on the processor. The SMMU translates the virtual address of the advice based on the virtual address itself, as well as other factors such as the device and the process using the virtual address. The present disclosure describes an improvement to the SMMU.

The SMMU described employs a single pipeline that behaves as multiple units. The SMMU receives requests from multiple interfaces, and processes the requests, producing the same result as multiple units in multiple pipelines. Each received request is tagged based on the unit that the request belongs to. Pipeline logic, based on the tagging, directs the request to the appropriate unit within the pipeline. Architecturally visible structures are replicated within the pipeline, which allows the SMMU to present multiple units to the interfaces. However, units that are not architecturally visible (or are architecturally hidden) can be combined to save area on the chip and save power.

Figure 1:
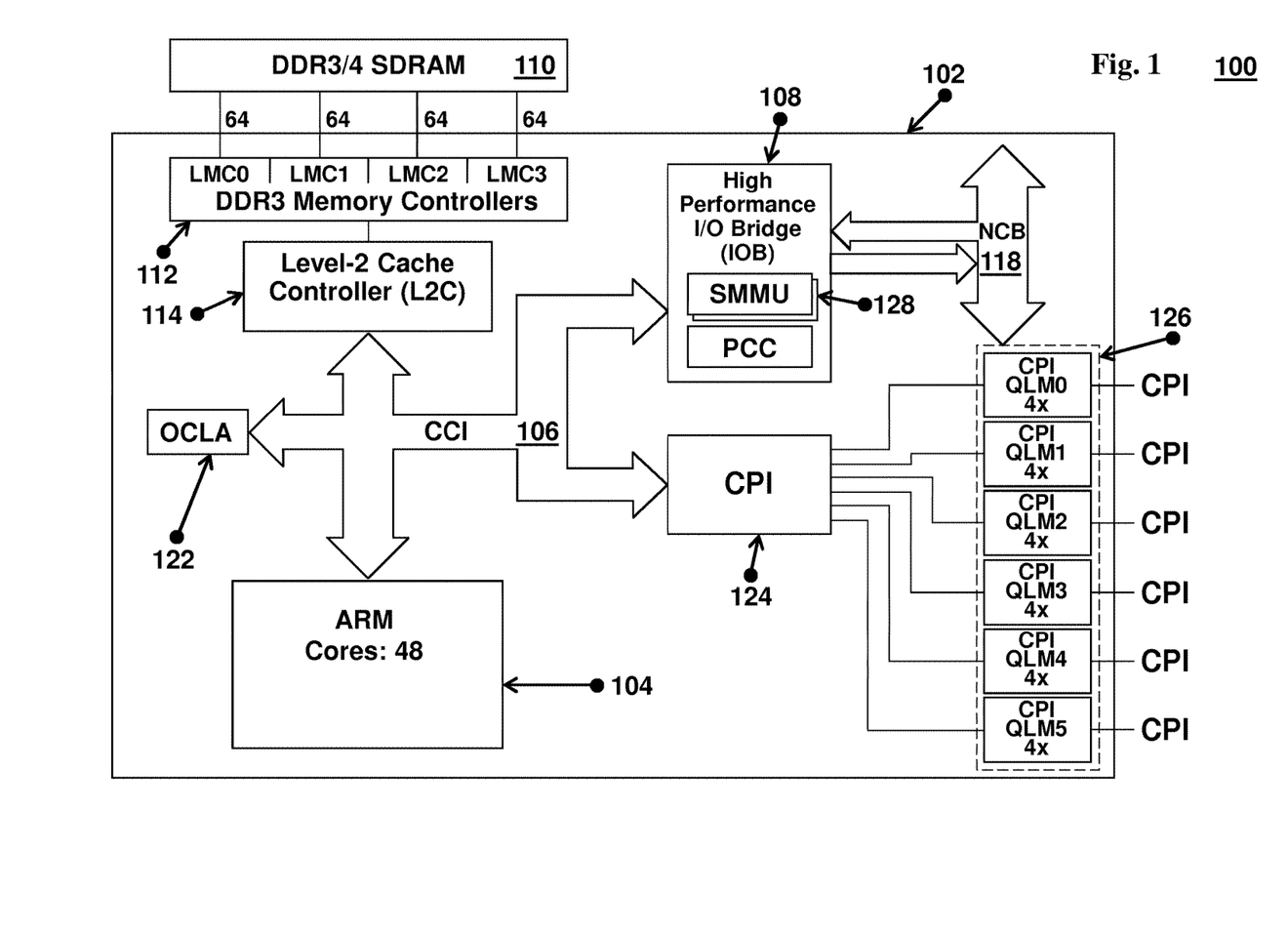
FIG. 1 is a block diagram illustrating an example embodiment of a hardware processor.

FIG. 1 is a block diagram 100 illustrating an example embodiment of a hardware processor 102. In an embodiment, the processor 102 can be the ThunderX™ designed by Cavium™, Inc.

The processor 102 is addresses the needs of scale out data centers and the trends in large computing infrastructures. The processor 102 integrates a plurality of cores 104, for example including high performance 64-bit ARMv8 (Advanced RISC (Reduced Instruction Set Computing) Machines) processors, a cache-coherent interconnect 106, hardware accelerators designed for large data applications, virtualized networking, and switching functions, an on-chip logic analyzer unit (OCLA) 122 and scalable input/output (I/O). The processor 102 offers best-in-class levels of performance and integration. The processor further integrates a high performance I/O bridge (IOB) 108 in combination with a near-coprocessor bus (NCB) 118 to enable I/O and coprocessor devices to communicate to memory and the cores 104.

Emerging data center applications have at least the following characteristics: (1) large scale (scaling to thousands of processors), (2) virtualization—the ability to support multiple separate virtualized domains and (3) big data sets.

The processor 102 includes custom designed ARMv8 cores 104. Area efficiency of the cores 104 allows the processor 102 to include 48 cores, in one embodiment. The high core density enables data-center systems that require a large numbers of cores to use fewer processors 102 than solutions employing other processors. The processor 102 cores 104 support efficient execution of integer, floating point, and vector workloads. A 16 MB shared Level-2 cache 114, operatively coupled to a memory controller 112 and memory 110, provides a fully cache coherent software environment. In addition, the processor 102 can be connected to other instances of processors 102 by a coherent fabric to provide, for example, up to 192 cores and 1 TB of cache-coherent memory.

Multiple processors 102 are typically connected by a data-center fabric to build large data-center systems. This fabric is typically constructed with external switches and networking infrastructure. The present processor 102 contains a built-in switch that reduces the number of external switches required to connect processors 102 and also increases the flexibility of the data-center network design. For example, the processor's 102 10 Gb Ethernet ports 126 (e.g., Serializer/Deserializer (SerDes) Quad-Lane Modules (QLMs)) can be used to connect clusters of processors 102 together without employing external switches in a flexible topology, for example, by employing the Coherent Processor Interconnect (CPI) 124. This reduces a data center solution's overall component count, power consumption, and physical space, and increases system reliability. In an example embodiment, the CPI 124 can receive data from and send data to other processors via the SerDes QLMs 126.

Shared data-center infrastructure, such as cloud-computing environments, place specific demands on virtualization. Shared infrastructures provide security and quality-of-service guarantees to each user at a low cost by amortizing the operating and capital expense over a large number of users. The processor 102 provides specific features to support virtualized environments. The processor's 102 ARMv8 core 104 supports a fully virtualized software environment for guest operating systems.

A System Memory-Management Unit (SMMU) 128 (also known as a I/O Memory Management Unit (IOMMU)) provides translation and isolation of I/O addresses of different devices and guest operating systems in response to an I/O request (e.g., a memory read or write). The SMMU 128 is responsible for translating read/write transaction virtual addresses, intermediate physical addresses, or physical addresses into a system physical address. The SMMU 128 receives a read/write transaction from the NCB 118, the transaction including an untranslated address (e.g., a virtual address) and a stream ID that indicates the requesting device. The SMMU 128 converts the untranslated address and stream ID to a physical memory address. The IOB then uses the physical address to complete the I/O request at memory 110.

The processor's 102 virtualized network interface controllers (VNICs) allow virtual machines within a single processor 102 and between multiple processors 102 to communicate directly without a software virtual switch. The processor's 102 virtualized network interface frees up more computation resources for the applications since software is relieved from the burden of emulating network functions between virtual machines.

Administering the large data-center network is another challenge for large, shared infrastructure environments. The processor's 102 integrated switch and VNICs provide a software-defined network that allows system administrators to build virtual networks that provide security and QoS guarantees. The processor's 102 switch supports software-configurable encapsulations, thereby allowing a system administrator to both support and provision a large global network and provide client virtual environments their own private networks.

Large data applications often require streaming access to data. The processor's 102 built-in SATA and PCIe interfaces can stream data to and from storage devices through on-chip DMA accelerators. Streaming data may be processed in a high-performance energy-efficient manner by using the built-in data compression/decompression and regular-expression engines. The large amounts of data present in "Big Data" applications lends itself to hardware acceleration where repetitive tasks may be performed in a more energy-efficient manner than by software alone. The processor's 102 integrated SATA and PCIe interfaces facilitate the construction of large data-storage nodes with minimal board footprint and component count. SATA drives can be directly connected to the processor's 102 integrated SATA controllers, creating a compact high-capacity storage node. The integrated PCIe controllers with configurable lane width enable connectivity to other storage peripherals such as SAS controllers and solid-state storage.

Figure 2:
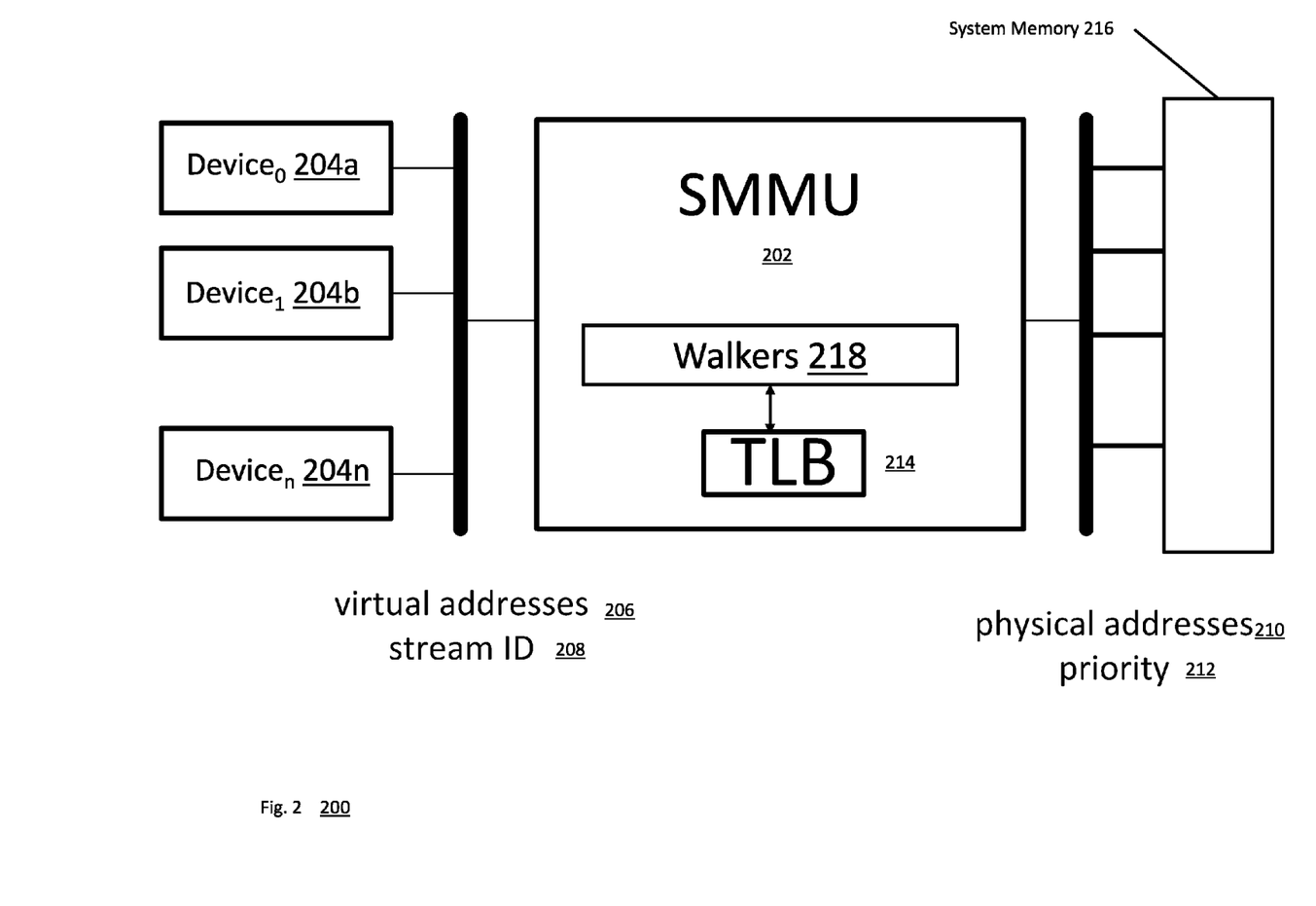
FIG. 2 is a block diagram illustrating an example embodiment of the present disclosure.

FIG. 2 is a block diagram 200 illustrating an example embodiment of the present disclosure. A System Memory Management Unit (SMMU) 202 receives a corresponding virtual addresses 206 and stream IDs 208 from a plurality of devices 204a-n. Each device can be a network interface of a computer, laptop, server, tablet, or smart phone. Each device can also be a hard drive or processor/coprocessor of a computer, laptop, server, tablet, or smart phone. Each stream ID can represent a process such as a web browser, email application, smart phone app, tablet app, or etc. The SMMU 202 converts the virtual addresses 206 and stream IDs 208 to a physical address 210 and a priority 212 based on registers of the SMMU 202 and a transition lookaside buffer (TLB) 214, which is a cache of recently performed virtual-to-physical address conversions. If the TLB 214 does not store the requested virtual-to-physical address conversion, the SMMU 202 includes page walkers 218 which perform the conversion and then store it in the TLB 214 for later use.

The SMMU 202 also uses the stream identifier as a secure context identifier, and looks up a corresponding bit in a secure state determination array to determine if the memory access should be promoted to secure. Some devices, such as the SMMU 202, have other criteria that allow setting secure mode even if this bit is not set. The bit also promotes any interrupt passing through the SMMU 202 to secure mode.

The SMMU 202 compares the stream identifier to all of the entries of stream matchers to determine a context number, or determine that no context matches. The SMMU 202 looks up the context/virtual address, secure state, and address in the TLB 214, which is a cache memory storing context to physical address translations. The TLB 214 is a 1024 entry structure with 32 ways (which are sub-areas of the TLB 214). If the transaction hits, the TLB 214 outputs the translated physical address. If the transaction misses, the physical address is translated from the context, for example, by page walkers 218. The page walkers 218 of the SMMU 202 walk the page table to find the virtual-to-physical address conversion. This process can be accelerated by a 256-entry walker-cache unit (WCU) (not shown) which caches intermediate translations. If the WCU misses, the page tables are read from the L2C (e.g., cache 114 of FIG. 1) or DRAM (e.g., memory 110 of FIG. 1). Page table accesses may violate secure mode constraints, however, which can create an external fault. If appropriate, the translation and state are saved back to the TLB 214 and/or WCU (not shown) of the page walkers 218. The SMMU 202 returns the translation to read/write to system memory 216, either directly or through a cache.

A context stores information specific to a particular process or a device/process combination. The context may describe, for example, how to perform memory translation in a virtual memory system. Context information may be stored in a memory, in registers, on devices or in any other location. For example, context information can be stored in memory registers of the SMMU 202.

Figure 3:
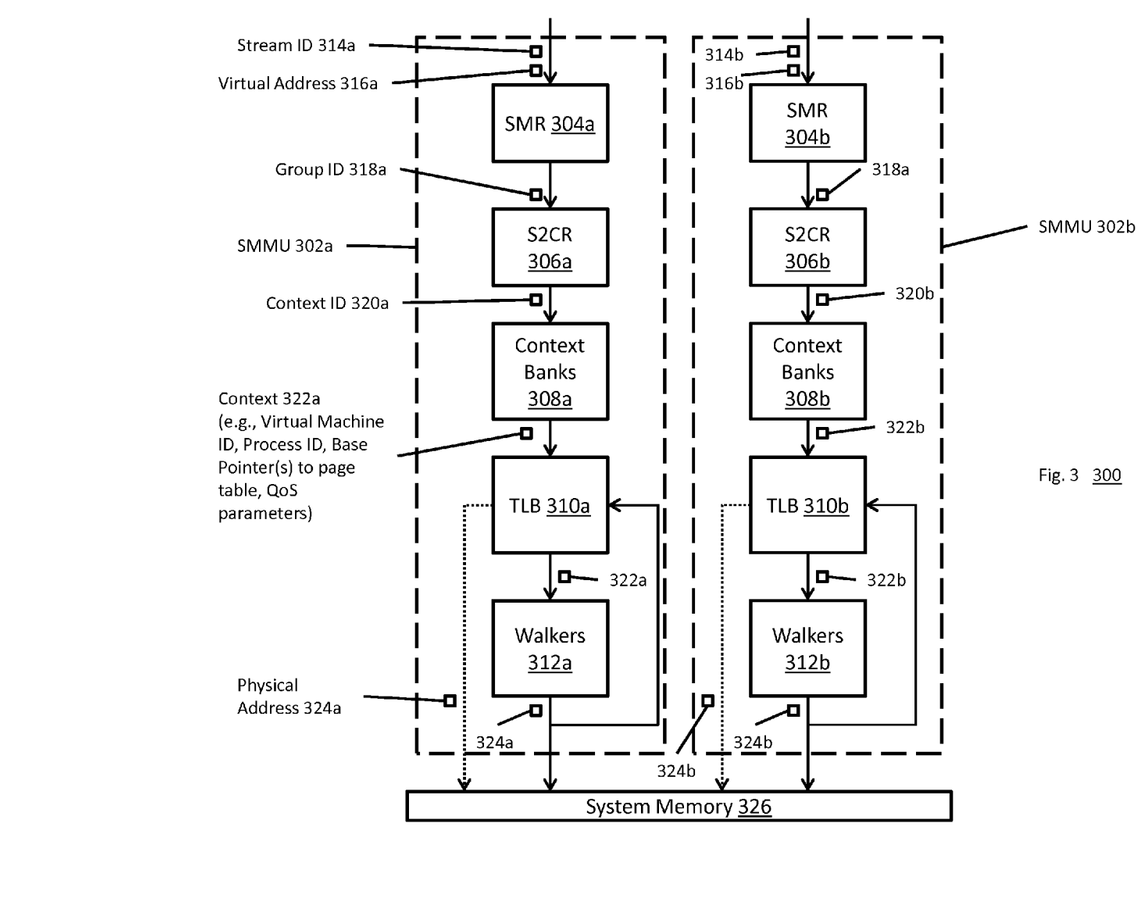
FIG. 3 is a block diagram illustrating an example embodiment of a multiple independent SMMU pipelines.

FIG. 3 is a block diagram 300 illustrating an example embodiment of a multiple independent SMMU 302a-b pipelines. ARM has specific architecture requirements to implement a certain number of registers. One way to meet these architecture requirements is implementing multiple independent copies of the SMMU 302a-b, as shown in FIG. 3.

SMMU 302a receives a Stream ID 314a and a virtual address 316a to be translated. A Stream Match Register Table (SMR) module 304a is a look-up table (LUT) configured to convert the Stream ID 314a to a Group ID 318a. A Stream to Context Register (S2CR) module 306a is a LUT configured to convert the Group ID 318a to a context ID or context bank index 320a. The context banks 308a produce a context 322a using the context bank index 320a. The context stores data to perform a full address translation, such as a Virtual Machine ID, Process ID, and base pointer(s) to a page table). Optionally, the context can include other information such as Quality of Service (QoS) information or parameters. From here, a translation lookaside buffer (TLB) 310a, which a cache of context-to-physical address translations, performs a lookup to see if the context 322a has been recently translated and if the recent translation is stored in the TLB 310a. If so, the TLB 310a loads the physical address 324a and forwards it to a system memory 326 as an output of the SMMU 302a.

If the translation cannot be found in the TLB 310a, a request to find a physical address associated with the context 322a is sent to a page table walker 312a, which performs a full page table walk. The walkers 312a may include its own internal cache separate from the TLB 310a, which can be used for a lookup before doing a full page table walk. After retrieving the physical address associated with the context 322a, the walkers 312a output the physical address 324a to the system memory 326, and in parallel, output the physical address 324a to the TLB 310a to be stored for future lookups.

A person of ordinary skill in the art can recognize that the SMMU 302b and its corresponding sub-modules operates similarly to SMMU 302a.

In the ARM SMMU V2 architecture, each SMMU 302a-b is limited to a maximum of 65536 ($2^{16}$) Stream IDs and 128 ($2^7$) contexts. Multiple architecturally visible SMMUs 302a-b can increase the effective number of Stream IDs and contexts available to the processor 102 of FIG. 1. A straightforward implementation of multiple independent SMMUs 302a-b, as shown by FIG. 3, provides multiple independent copies of the SMMU 302a-b as many times as needed, providing no data exchange or sharing of data, and does not re-use common resources.

However, providing n copies of a design consumes approximately n times the area on the chip (e.g., a linear relationship of area consumed to copies of the design). Further, n copies of the same design consumes approximately n times the power (e.g., a linear relationship of power consumed to copies of the design). However, multiple copies provide the benefit of n times the throughput. However, the total resulting throughput provided by the multiple copies of the SMMUs 302a-b may exceed specification requirements, such that the throughput is unnecessary. Further, having multiple separate design units prevents data sharing across the separate design units. Data (e.g., data stored in a cache) in one unit may be useful for the other units to access. Allowing data to be shared across units can improve performance, in addition to saving area on the chip.

In an embodiment of the present disclosure, a pipelining methodology reduces the area and power requirements, while maintaining the outward appearance of having multiple units. Pipelining the multiple units can, in some circumstances, reduce speed. However, pipelining provides the multiple units with sharing certain structures and memories, and therefore access to data, potentially improving performance and/or reducing area occupied on the chip.

In general, the pipelined unit adds add $\log_2(n)$ bits of state at every stage of the pipeline. These bits record which design unit the data is associated with. In a pipelined design, different stages may be associated with different units. Every structure that needs to be architecturally visible as multiple structures is replicated n times. Caching structures, which are architecturally invisible, can be made larger and shared within the pipeline, as performance requirements dictate.

Figure 4:
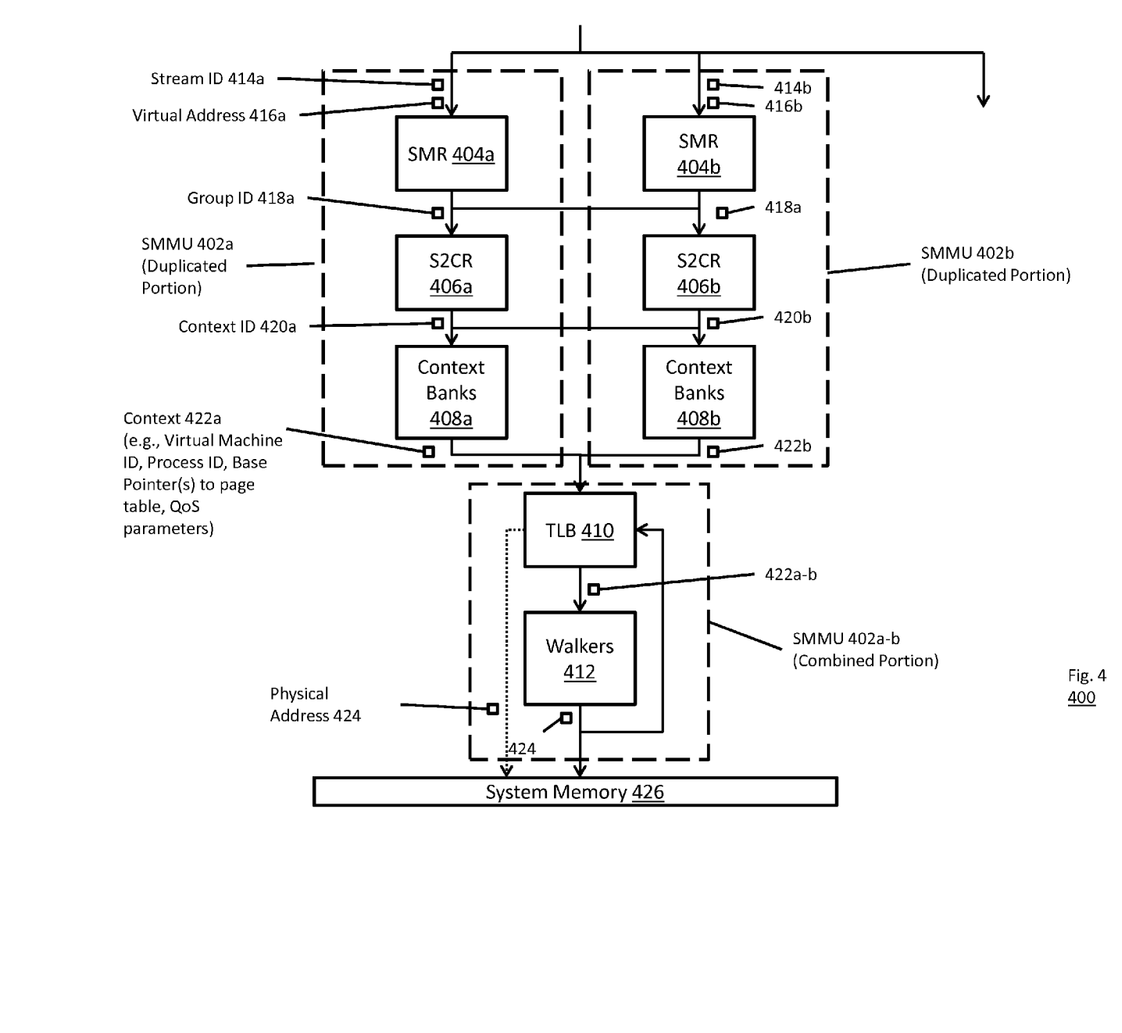
FIG. 4 is a block diagram illustrating an example embodiment of a multiple SMMU pipeline with shared resources.

FIG. 4 is a block diagram 400 illustrating an example embodiment of a SMMU 402a-b pipeline having shared resources. The SMMU 402a-b pipeline described herein solves the above described problems and provides the above described advantages. The SMMU 402a-b is an architecturally merged unit that is visible as multiple SMMUs 402a-b. At every point in the design, shared logic units track which SMMU 402a-b each translation request is associated with based on a tagged identifier of the request propagated through the pipeline. The SMMU 402a-b has a replicated portion including structures such as SMR 404a-b, S2CR 406a-b, and context banks 408a-b, which are separated such that software interfacing with the processor 102 views multiple distinct SMMUs 402a-b. However, while the SMMU 402a-b are separate and have physically separate SMRs 404a-b, S2CRs 406a-b, and context banks 408a-b, associated pipeline circuitry is combined/merged for area savings. As the request is propagated through the SMR 404a-b, S2CR 406a-b, and context banks 408a-b, the tagged identifier of the request informs the combined logic which particular SMR 404a-b, S2CR 406a-b, and context banks 408a-b to propagate the request to. FIG. 4 shows the merged associated pipeline circuitry in the connection lines received at the SMRs 404(a), S2CR 406a-b, context banks 408a-b, and output from the context banks 408a-b.

After the context banks 408a-b, the SMMUs 402a-b employ combined units in the pipeline. A unified TLB 410 has n times as many entries as the TLBs 310a-b in each SMMU 302a-b of the multiple independent unit design of FIG. 3. Referring to FIG. 4, one, larger, TLB 410 increases efficiency. For example, if one of the SMMUs 402a-b is not using a proportional amount of TLB 410 entries, another SMMU 402a-b can use them, resulting in a higher hit rate and therefore better performance. For example, in the embodiment shown in FIG. 3, TLB 310a and 310b can have 128 entries each and therefore 256 entries total, where TLB 410 has one memory having 256 entries total. However, as one example, SMMU 302a may map 100 context/physical addresses pairings in its TLB 310a while SMMU 302b may be frequently using 200 context/physical addresses pairings. In this example, the TLB 310a maps all 100 entries used by SMMU 302a. The TLB 310a has 28 unused entries. The TLB 310b, however, can only map 128 context/physical addresses pairings, and has to cycle out the cache entries for the other 62 context/physical addresses pairings. In the embodiment shown in FIG. 4, however, the example applying to SMMUs 402a and 402b does not have the same problem. The extra entries from SMMU 402b can use the entries unused by SMMU 402a. All 256 cache entries of the TLB 410, which leads to more cache hits and higher performance.

The unified walker pool 412 has n times as many walkers as the walkers 312a-b in each SMMU 302a-b of the multiple independent unit design of FIG. 3. Referring to FIG. 4, similar to the TLB 410, the larger walker pool 412 allows more efficient use, leading again to greater performance. The rest of the associated pipeline circuitry is more or less unchanged from the single pipeline design, yielding area savings.

Figure 5:
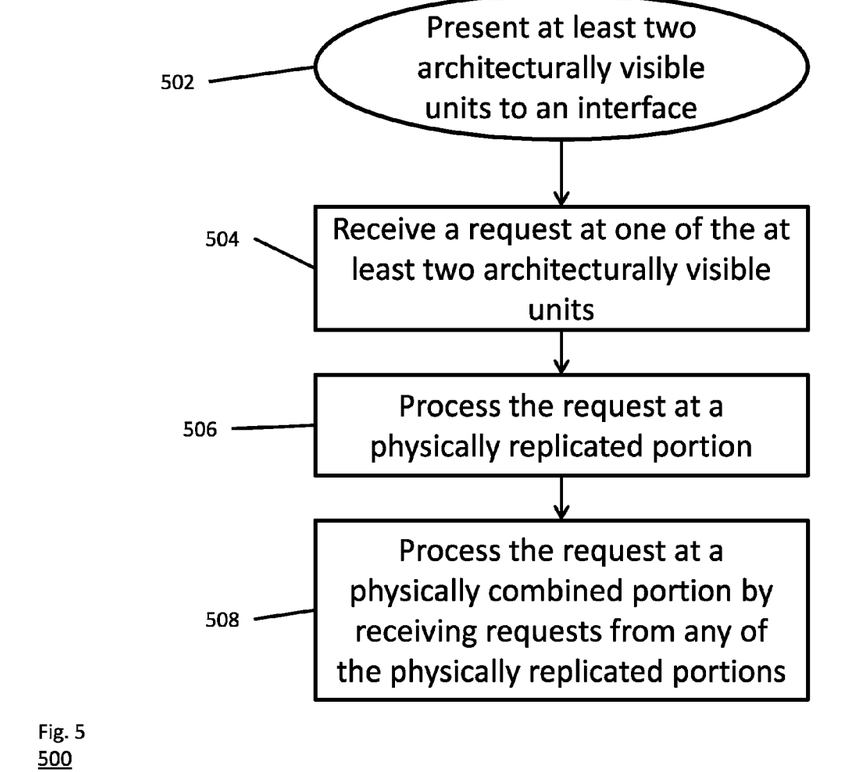
FIG. 5 is a flow diagram illustrating an example embodiment of the present disclosure.

FIG. 5 is a flow diagram 500 illustrating an example embodiment of the present disclosure. The process begins by presenting at least two architecturally visible units to an interface (502). In an embodiment, the architecturally visible units are an SMMU, as described above. The process then receives a request at one of the at least two architecturally visible units (504). The process then processes the request at a physically replicated portion of the at least two architecturally visible units (506) and then processes the request at a physically combined portion by receiving requests from any of the physically replicated portions (508). However, in another embodiment, the process can process the request at the physically combined portion before processing the request at the physically replicated portion.

Figure 6:
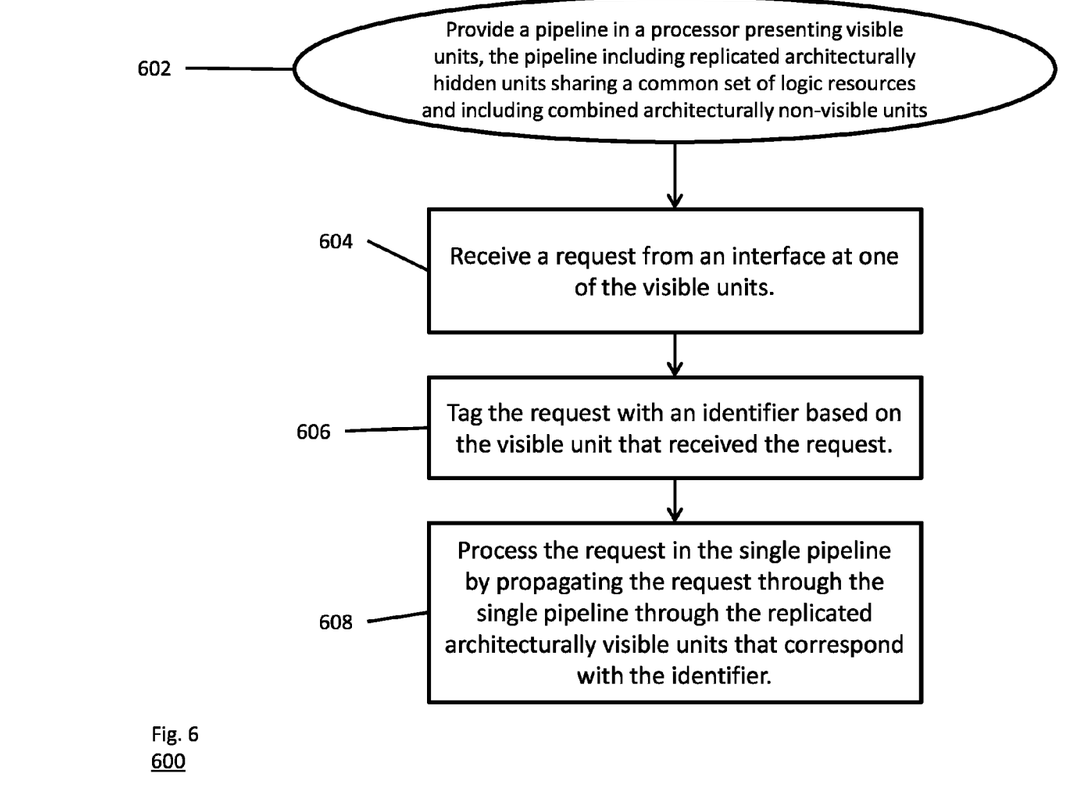
FIG. 6 is a flow diagram illustrating an example embodiment of a process of the present disclosure.

FIG. 6 is a flow diagram 600 illustrating an example embodiment of a process of the present disclosure. The process first provides a pipeline in a processor presenting visible units. The pipeline includes replicated architecturally hidden units sharing a common set of logic resources and also includes combined architecturally non-visible units. The process then receives a request from an interface at one of the visible units (604). The process then tags the request with an identifier based on the visible unit that received the request (606). Then, the process processes the request in the pipeline by propagating the request through the single pipeline through the replicated architecturally visible units that correspond with the identifier.

Figure 7:
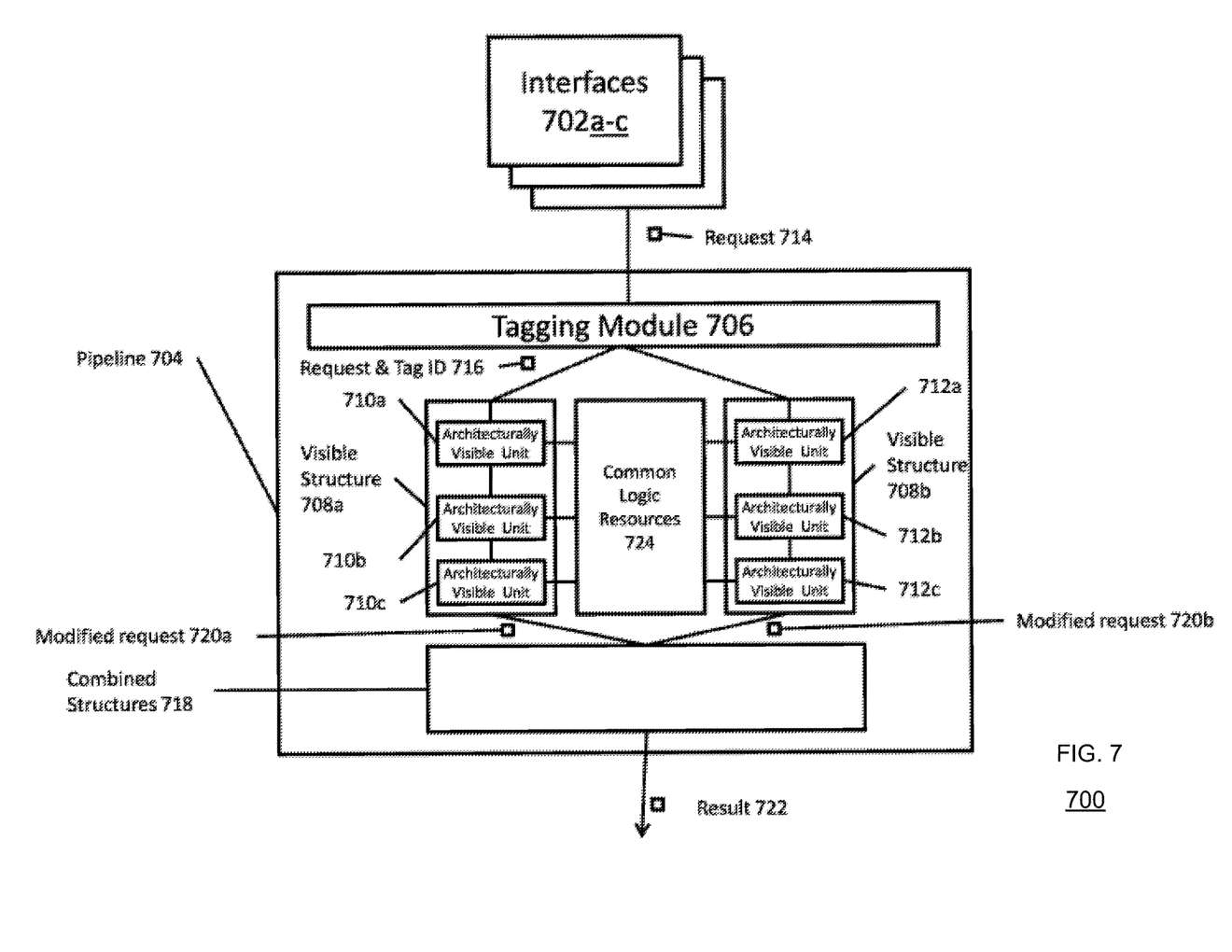
FIG. 7 is a block diagram illustrating an example embodiment of the present disclosure.

FIG. 7 is a block diagram 700 illustrating an example embodiment of the present disclosure. A pipeline 704 is coupled to receive a request 714 from one of interfaces 704a-c. A tagging module 706 of the pipeline 704 tags the request 714 and sends it to a visible unit 708a-b as a request & tag ID 716. Each visible unit 708a-b includes a plurality of corresponding architecturally visible structures 710a-c and 712a-c. The architecturally visible structures 710a-c and 712a-c use shared common logic resources 724. The common logic resources 724, based on the tag provided by the tagging module 706, direct the request & tag ID 716 to the correct architecturally visible unit 710a-c or 712a-c based on the visible unit 708a-b assigned to the request.

The architecturally visible structures 710a-c and 712a-c are configured to output a modified request 720a-b, which is a partially completed request to be finished by the rest of the pipeline 704. Combined structures 718 (e.g., architecturally hidden structures) receive the modified request 720a or 720b and output a result 722 after processing it. The combined structures 718 receive inputs from the shared architecturally visible structures 710 and 712.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, Hiper-LAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method of interfacing a pipeline with two or more interfaces in a hardware processor, the method comprising:

providing a single pipeline in a hardware processor, the single pipeline presenting at least two visible units, the single pipeline including replicated architecturally visible structures belonging to each the visible units, shared logic resources shared among the replicated architecturally visible structures, and shared architecturally hidden structures shared among the visible units;

receiving a request from one of a plurality of interfaces at one of the at least two visible units;

tagging the request with an identifier based on the one of the at least two visible units that received the request; and processing the request in the single pipeline by propagating the request through the replicated architecturally visible structures of a respective one of the visible units that corresponds with the identifier as directed by the shared logic resources.

2. The method of claim 1, wherein the request is a memory request, and further comprising:

outputting a physical address to a memory to complete the memory request.

3. The method of claim 1, wherein the architecturally visible structures include at least one of an architecturally visible memory, a content addressable memory, and a register, and the architecturally hidden structures include at least one of a transition look aside buffer and a page walker.

4. The method of claim 1, wherein processing the request at the shared architecturally hidden structures includes receiving the request from any of the replicated architecturally visible structures.

5. The method of claim 1, further comprising utilizing the architecturally hidden structures independent from utilizing of any of the replicated architecturally visible structures.

6. The method of claim 1, further comprising:

converting information of the request representing at least one of a device, a user and a virtual machine to information representing a context including at least one of a virtual machine identifier, a process identifier, and at least one pointer to a page table.

7. The method of claim 1, wherein each of the replicated architecturally visible structures corresponds with one of the presented visible units.

8. The method of claim 1, wherein the visible units are arranged in parallel.

9. The method of claim 6, wherein converting information of the request includes converting the information to a context at the replicated architecturally visible structures.

10. The method of claim 9, further comprising converting the context to a physical memory address at the combined architecturally hidden structures.

11. A system for interfacing a pipeline with two or more interfaces in a hardware processor, the system comprising:

a single pipeline in a hardware processor, the single pipeline presenting at least two visible units, the single pipeline including replicated architecturally visible structures belonging to each of the visible units, shared logic resources shared among the replicated architecturally visible structures, and shared architecturally hidden structures shared among the visible units, wherein the at least two visible units are configured to receive a request from one of a plurality of interfaces; and a tagging module configured to tag the request with an identifier based on the one of the at least two visible units that received the request; and wherein the single pipeline is configured to process the request by propagating the request through the replicated architecturally visible structures of a respective one of the visible units that corresponding with the identifier as directed by the shared logic resources.

12. The system of claim 11, wherein:

the request is a memory request, and the single pipeline is further configured to output a physical address to a memory to complete the memory request.

13. The method of claim 11, wherein the architecturally visible structures include at least one of an architecturally visible memory, a content addressable memory, and a register, and the architecturally hidden structures include at least one of a transition look aside buffer and a page walker.

14. The system of claim 11, wherein the architecturally hidden structures are further configured to process the request by receiving the request from any of the replicated architecturally visible structures.

15. The system of claim 11, wherein the architecturally hidden structures are utilized independently from utilizing of any of the replicated architecturally visible structures.

16. The system of claim 11, wherein the single pipeline is configured to convert information of the request representing at least one of a device, a user and a virtual machine to information representing a context including at least one of a virtual machine identifier, a process identifier, and at least one pointer to a page table.

17. The system of claim 11, wherein each of the replicated architecturally visible units corresponds with one of the presented visible units.

18. The method of claim 11, wherein the visible units are arranged in parallel.

19. The system of claim 16, wherein the single pipeline is further configured to convert information of the request at the replicated architecturally visible structures.

20. The system of claim 19, wherein the single pipeline is further configured to convert the context to a physical memory address at the architecturally hidden structures.

* * * * *